(12) United States Patent
Bitauld

(10) Patent No.: US 11,223,424 B2
(45) Date of Patent: Jan. 11, 2022

(54) FIBRE-BASED COMMUNICATION

(71) Applicant: Nokia Technologies Oy, Espoo (FI)

(72) Inventor: David Bitauld, Massy (FR)

(*) Notice: Subject to any disclaimer, the term of this patent is extended or adjusted under 35 U.S.C. 154(b) by 0 days.

(21) Appl. No.: 17/267,315

(22) PCT Filed: Aug. 10, 2018

(86) PCT No.: PCT/FI2018/050580
§ 371 (c)(1),
(2) Date: Feb. 9, 2021

(87) PCT Pub. No.: WO2020/030847
PCT Pub. Date: Feb. 13, 2020

(65) Prior Publication Data
US 2021/0344426 A1    Nov. 4, 2021

(51) Int. Cl.
*H04B 10/532* (2013.01)
*H04B 10/079* (2013.01)
*H04B 10/548* (2013.01)
*H04B 10/85* (2013.01)

(52) U.S. Cl.
CPC ......... *H04B 10/532* (2013.01); *H04B 10/079* (2013.01); *H04B 10/548* (2013.01); *H04B 10/85* (2013.01)

(58) Field of Classification Search
None
See application file for complete search history.

(56) References Cited

U.S. PATENT DOCUMENTS

| 2015/0172048 A1* | 6/2015 | Wabnig | H04B 10/70 380/256 |
| 2015/0249537 A1* | 9/2015 | Wabnig | H04B 10/70 380/256 |
| 2016/0234018 A1 | 8/2016 | Frohlich et al. | |
| 2016/0352515 A1 | 12/2016 | Bunandar et al. | |

(Continued)

FOREIGN PATENT DOCUMENTS

| CN | 206413014 U | 8/2017 |
| GB | 2546514 A | 7/2017 |

(Continued)

OTHER PUBLICATIONS

Lucamarini et al., "Overcoming the Rate-distance Limit of Quantum Key Distribution without Quantum Repeaters", Nature, vol. 557, May 17, 2018, pp. 400-403.

(Continued)

*Primary Examiner* — Jai M Lee
(74) *Attorney, Agent, or Firm* — Nokia Technologies Oy

(57) ABSTRACT

In accordance with an example embodiment of the present invention, there is provided an apparatus (160) comprising two inputs configured to receive two optical signals from two fibres (155, 157) from two respective optical transmitters, a beam splitter configured to convert the optical signals into dual rail form, the apparatus being configured to cause the optical signals to interfere with each other, a plurality of single photon detectors configured to measure the dual rail form optical signals, and at least one processing core configured to obtain compensation adjustment information concerning the two fibres and to inform the optical transmitters of the compensation adjustment information.

20 Claims, 11 Drawing Sheets

(56) References Cited

U.S. PATENT DOCUMENTS

| | | | |
|---|---|---|---|
| 2017/0104546 A1* | 4/2017 | Bitauld | H04J 14/06 |
| 2017/0222731 A1 | 8/2017 | Lucamarini et al. | |
| 2018/0109379 A1* | 4/2018 | Bitauld | G02B 6/29352 |
| 2018/0294960 A1* | 10/2018 | Bitauld | H04B 10/548 |

FOREIGN PATENT DOCUMENTS

| | | |
|---|---|---|
| WO | 2014/060793 A1 | 4/2014 |
| WO | 2015/189456 A1 | 12/2015 |
| WO | 2016/170223 A1 | 10/2016 |
| WO | 2017/055676 A1 | 4/2017 |
| WO | 2017/055677 A1 | 4/2017 |
| WO | 2017/168032 A1 | 10/2017 |

OTHER PUBLICATIONS

Wang et al., "Long Distance Co-propagation of Quantum Key Distribution and Terabit Classical Optical Data Channels", arXiv, Oct. 14, 2016, pp. 1-8.

International Search Report and Written Opinion received for corresponding Patent Cooperation Treaty Application No. PCT/FI2018/050580, dated Feb. 6, 2019, 17 pages.

\* cited by examiner

FIBRE-BASED COMMUNICATION

RELATED APPLICATION

This application claims priority to PCT Application No. PCT/FI2018/050580, filed on Aug. 10, 2018, which is incorporated herein by reference in its entirety.

FIELD OF INVENTION

The present invention pertains to the field of fibre-based communication, such as for example polarization-division multiplexing or quantum key distribution.

BACKGROUND OF INVENTION

Information may be secured in a number of ways. Information that is confidential in nature may comprise financial, medical, corporate, political or personal information, for example.

Confidential information may be stored in secure premises, preventing accidental or malicious access to the information by placing it in a locked place, such as for example in a safe in an office. Corporate locations may be further, or alternatively, provided with alarm systems, guards, fences and/or other access control functions.

Confidential information may be stored in computers that are not connected to any unsecure networks, to prevent unauthorized network intrusion therein to obtain the information. Such computers may be referred to as "air walled" computers as they have no connection to unsecure networks.

One way to prevent unauthorized access to confidential information is encryption, wherein a plaintext, for example a text in a natural language, such as French, is converted to a ciphertext using an encryption algorithm and a key. Encryption algorithms are designed to render it very difficult to obtain the plaintext from the ciphertext without the key. In general, ciphertext may be known as encrypted information.

In quantum communication, QC, two parties may exchange information encoded in quantum states. The quantum states, or qubits, may comprise specially defined properties of photons such as pairs of polarization states, such as 0° and 90°, or circular basis states such as left-handedness and right-handedness. Through quantum communication, the two parties may produce a shared random series of bits known only to them, which can then be used as secret keys in subsequent encryption and decryption of messages. A third party can, in theory, eavesdrop on the QC between the two parties. Such eavesdropping perturbs the QC, however, introducing anomalies that the two intended parties can detect. The two parties may post-process the results of the QC to remove any partial information acquired by an eavesdropper, and form shared secret keys from the remaining information resulting from the QC.

An eavesdropper intercepting and re-transmitting a photon comprised in a quantum communication can only guess the original sending basis when it re-encodes and re-transmits the photon toward its original destination. The receiver may detect the eavesdropping since for subsets of bit values for which sending basis and measuring basis are found to match, parity values should match exactly, assuming the communication system is well tuned and free from imperfections in transmission and reception. Discrepancies in bit values introduced by eavesdropping enable the transmitter and receiver to detect eavesdropping and correct the secret keys.

SUMMARY OF THE INVENTION

In accordance with a first aspect of the present invention, there is provided an apparatus comprising two optical transmitters, each optical transmitter comprising a dual-rail encoder configured to obtain light from a light source and to output dual-rail encoded light and a polarization rotator combiner configured to convert the dual-rail encoded light into polarization encoded light, at least one processing core configured to obtain compensation adjustment information concerning two fibres and to control the dual-rail encoders based at least in part on the compensation adjustment information, wherein the light sources of the optical transmitters comprise laser sources operating at the same frequency, such that the laser sources are injection locked to the same frequency.

In accordance with a second aspect of the present invention, there is provided an apparatus comprising two inputs configured to receive two optical signals from two fibres from two respective optical transmitters, a beam splitter configured to convert the optical signals into dual rail form, the apparatus being configured to cause the optical signals to interfere with each other, a plurality of single photon detectors configured to measure the dual rail form optical signals, and at least one processing core configured to obtain compensation adjustment information concerning the two fibres and to inform the optical transmitters of the compensation adjustment information.

In accordance with a third aspect of the present invention, there is provided a method, comprising in each of two optical transmitters, obtaining light from a light source, encoding dual-rail encoded light in a dual-rail encoder and converting the dual-rail encoded light into polarization encoded light, obtaining compensation adjustment information concerning two fibres and controlling the dual-rail encoders based at least in part on the compensation adjustment information, wherein the light sources comprise laser sources operating at the same frequency, such that the laser sources are injection locked to the same frequency.

In accordance with a fourth aspect of the present invention, there is provided a method comprising receiving two optical signals from two fibres from two respective optical transmitters, converting the optical signals into dual rail form optical signals and causing the dual rail form optical signals to interfere with each other, measuring the dual rail form optical signals, and obtaining compensation adjustment information concerning the two fibres, and informing the optical transmitters of the compensation adjustment information.

In accordance with a fifth aspect of the present invention, there is provided an apparatus comprising means for in each of two optical transmitters, obtaining light from a light source, encoding dual-rail encoded light in a dual-rail encoder and converting the dual-rail encoded light into polarization encoded light, obtaining compensation adjustment information concerning two fibres and controlling the dual-rail encoders based at least in part on the compensation adjustment information, wherein the light sources comprise laser sources operating at the same frequency, such that the laser sources are injection locked to the same frequency.

In accordance with a sixth aspect of the present invention, there is provided an apparatus, comprising means for receiving two optical signals from two fibres from two respective optical transmitters, converting the optical signals into dual rail form optical signals and causing the dual rail form optical signals to interfere with each other, measuring the dual rail form optical signals, and obtaining compensation adjustment information concerning the two fibres, and informing the optical transmitters of the compensation adjustment information.

In accordance with a seventh aspect of the present invention, there is provided a non-transitory computer readable medium having stored thereon a set of computer readable instructions that, when executed by at least one processor, cause an apparatus to at least, in each of two optical transmitters, obtain light from a light source, encode dual-rail encoded light in a dual-rail encoder and convert the dual-rail encoded light into polarization encoded light, obtain compensation adjustment information concerning two fibres and control the dual-rail encoders based at least in part on the compensation adjustment information, wherein the light sources comprise laser sources operating at the same frequency, such that the laser sources are injection locked to the same frequency.

In accordance with an eighth aspect of the present invention, there is provided a non-transitory computer readable medium having stored thereon a set of computer readable instructions that, when executed by at least one processor, cause an apparatus to at least receive two optical signals from two fibres from two respective optical transmitters, convert the optical signals into dual rail form optical signals and cause the dual rail form optical signals to interfere with each other, measure the dual rail form optical signals, and obtain compensation adjustment information concerning the two fibres, and informing the optical transmitters of the compensation adjustment information.

In accordance with a ninth aspect of the present invention, there is provided a computer program configured to cause exactly one of the following to be performed, when run on at least one processing core: either receiving two optical signals from two fibres from two respective optical transmitters, and converting the optical signals into dual rail form optical signals and causing the dual rail form optical signals to interfere with each other, and measuring the dual rail form optical signals, and obtaining compensation adjustment information concerning the two fibres, and informing the optical transmitters of the compensation adjustment information, or: receiving two optical signals from two fibres from two respective optical transmitters, and converting the optical signals into dual rail form optical signals and causing the dual rail form optical signals to interfere with each other, and measuring the dual rail form optical signals, and obtaining compensation adjustment information concerning the two fibres, and informing the optical transmitters of the compensation adjustment information.

INDUSTRIAL APPLICABILITY

At least some embodiments of the present invention find industrial applicability in improving communication over fibres and/or distribution of encryption keys.

DETAILED DESCRIPTION OF EXAMPLE EMBODIMENTS

Two field quantum key distribution, QKD, enables increasing a distance between communicating parties. Embodiments of the present disclosure relate to pre-compensating for polarization rotation in fibres used in two field communication, such that the two optical signals arrive at the receiver in a same polarization state. Thus polarization rotations incurred in the fibres used to convey the optical signals can be corrected for.

Dual-rail encoding may be implemented on two waveguides, which may be parallel. Information is encoded on the relative phase and amplitudes of the light in the two waveguides. Operations on the relative phase and amplitudes can be performed by phase shifters on at least one of the two waveguides and by optical couplers between the two waveguides. A light source, dual-rail encoder and polarization rotator-combiner may be fabricated monolithically on the same chip or using substrates of different materials by heterogeneous/hybrid integration, for example. A polarization rotator-combiner may rotate the polarization of the light coming from one waveguide with respect to the polarization of the light coming from the other waveguide and combine the light of the two waveguides in a single spatial optical mode. In general, dual-rail encoding may thus comprise modifying at least one of amplitude and phase of the light in at least one of the two waveguides.

Figure 1:
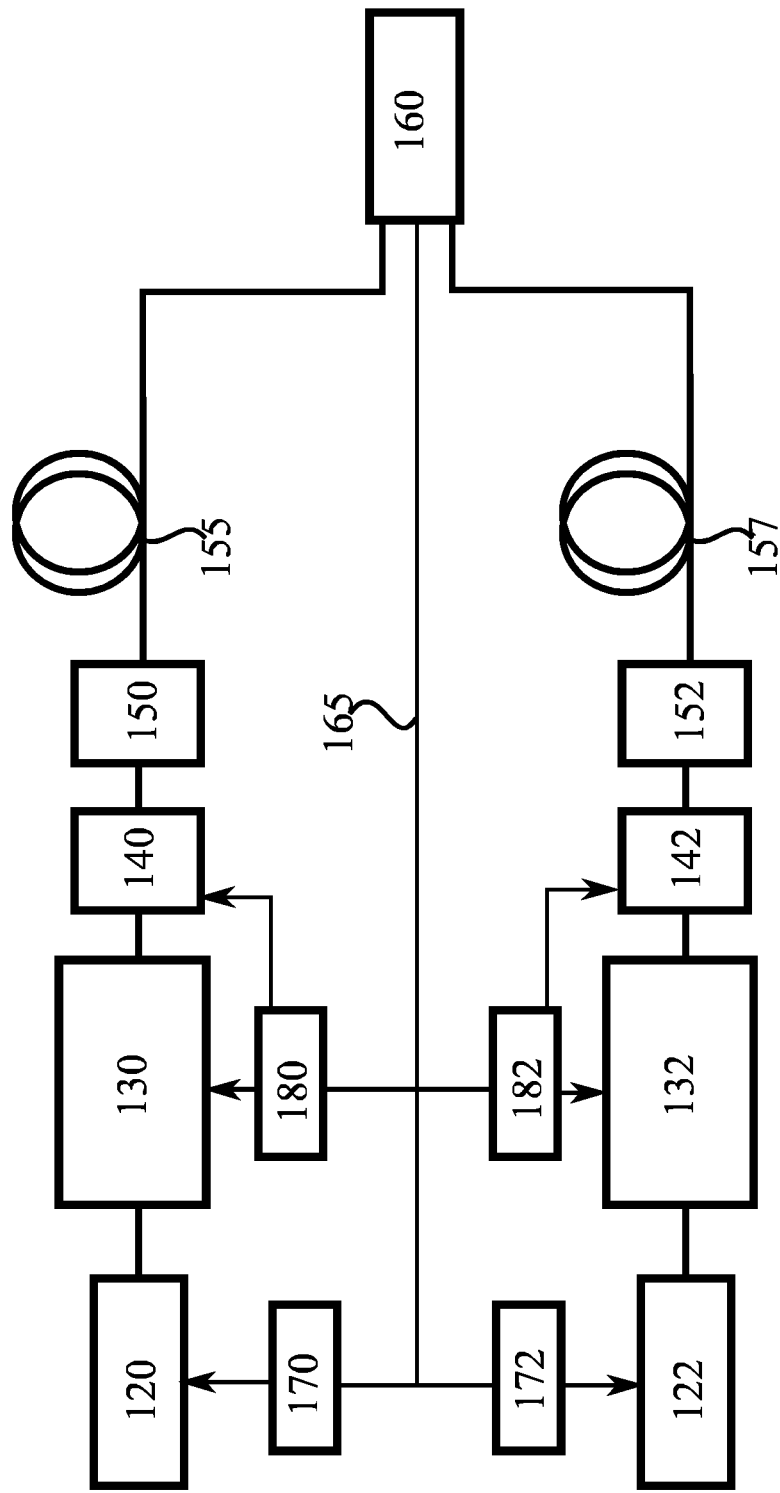
FIG. 1 illustrates an example system capable of supporting at least some embodiments of the present invention.

FIG. 1 illustrates an example system capable of supporting at least some embodiments of the present invention. The figure illustrates two emitters and receiver 160 with communication channels arranged therein between. The emitters may be housed in a same device, or they may be physically distinct from each other. A first emitter comprises signal generator 120, phase pre-compensator 130, attenuator 140 and polarization pre-compensator 150. Fibre 155 conveys an optical signal from the first emitter to receiver 160. A second emitter comprises, likewise, QKD signal generator 122, phase pre-compensator 132, attenuator 142 and polarization pre-compensator 152. Fibre 157 conveys an optical signal from the second emitter to receiver 160. Classical communication channel 165 is arranged to convey information from receiver 160 to QKD electronic processors 170 and 172, for the first and second emitters, respectively, and electronic controllers 180 and 182, again for the first and second emitters, respectively. Classical channel may comprise a wire-like communication interface, for example. Controllers 180, 182 may comprise, for example, field-programmable gate arrays, FPGAs, microcontrollers, microprocessors, processors or other controllers.

Signal generators 120, 122 may be configured to encode a bit sequence into an optical signal, for example in dual rail. Phase pre-compensators 130, 132 may be configured to enforce a phase difference between the optical signals generated by the two emitters. Phase compensators 130, 132 may further be configured to compensate for a phase propagation effect of the respective fibres 155, 157, to control a respective phase at which optical signals arrive in receiver 160 from the emitters.

Attenuators 140, 142 may be configured to attenuate an amplitude of the optical signals generated by the emitters, for example to a single-photon range. By single-photon range it may be meant, for example, that each pulse comprises a single photon, or a few photons. Finally, polarization pre-compensators 150, 152 may be configured to compensate for polarization rotation incurred in the fibres 155 and 157, respectively, to control the respective polarizations at which optical signals from the emitters arrive at receiver 160. The fibres 155, 157, may exhibit birefringence, wherein imperfections in the fibres, stress and/or bending of the fibres may cause polarization of photons passing through the fibres to rotate. Birefringence of fibres 155, 157 may be time-varying as temperatures of sections of the fibres may change, the fibres may be physically rearranged to change the bends it is arranged in, or the number of physical imperfections in the fibre may increase with time. The core of fibres 155, 157 may comprise glass or transparent plastic, surrounded by a layer of material with a lower index of refraction, such as a different glass or plastic, for example. Fibres 155, 157 may also cause, at least in part, attenuation of light passing through it and/or depolarization of light passing through it. The fibres may further be of different lengths. The fibres may be single-mode fibres.

In order for the two-field communication to succeed, the optical signals from the emitters should arrive at the receiver with the same polarization. As described above, the fibres may exhibit birefringence, causing polarizations to change during transit via the fibres. To correct this, receiver 160 may be configured to transmit compensation adjustment information to the emitters, via classical path 165. Classical path 165 may comprise a wire-line or at least in part wireless channel the emitters and the receiver may use to communicate information with each other. In some embodiments, classical path 165 uses the fibres 155, 157 to send optical signals which are not in the single-photon regime.

Base on the compensation adjustment information, electronic controllers 180, 182 may cause adjustment in the phase and amplitude of the optical signals produced in the emitters, as illustrated in FIG. 1. Further, electronic QKD processing units 170 and 172 may, respectively, adjust the encoded signal generated in signal generators 120, 122. In the illustrated two-field QKD system both emitters pre-compensate their polarization, and optionally phase, according to information provided by receiver 160 so that their respective signals arrive at receiver 160 with the same polarization, enabling the two-field concept. This polarisation control in the emitters is achieved by performing transformations in dual-rail, that is, adjusting the phase difference and the relative amplitude of the two rails, and combining the two rails with a polarization rotator combiner to obtain the desired polarization of the optical signal. This polarization is chosen in anticipation of the rotations that will happen in the fibres 155, 157. The dual rail encoded signal is transformed into a polarization encoded signal with a polarization rotator combiner before emitting it to the fibre. In some embodiments, only one of the emitters is configured to adjust the polarization. This may be sufficient to cause the optical signals from the emitters to arrive at the receiver with the same polarization, provided that the receiver can receive using any polarization.

Emitters and the receiver communicate with each other through the classical channel 165 for several purposes: firstly, the QKD protocol may comprise the receiver making its results public, emitters may exchange information to sift their key and calculate error correction and privacy amplification, secondly, control or monitoring of the phase difference introduced by the two transmission fibers, and thirdly, to monitor the polarization error at the receiver so that the transmitters can apply the right polarization pre-compensation. The information exchanged in this communication may be related to a subset of the detection events chosen randomly. The emitters and the receiver may agree, for example, on a random list of timeslots from which they publicly exchange information about the encoding and the resulting detection events, using classical channel 165. This allows them to evaluate the polarisation alignment, the phase drift, the error rate and the required error correction and privacy amplification, for example. Alternatively, test patterns may be emitted from the emitters for measurement, that is, detection at the receiver, to generate compensation adjustment information.

In the receiver end, two benefits are obtained from having the optical signals arrive in the receiver with the same polarization, firstly, the two optical signals can only interfere if they have the same polarization, and secondly, the receiver itself may be polarisation dependent, making it simpler to manufacture.

Each one of the two emitters may thus perform the following steps: generating a QKD signal, splitting the QKD signal in two rails, applying the adjustments on the phase difference and relative amplitudes of the two rails, optionally polarization multiplexing a reference signal, converting the dual-rail state of light into a polarization state with a polarization rotator combiner, PRC, and transmitting the optical signal through the optical fiber towards the receiver.

Benefits of embodiments disclosed herein include that the system may be implemented on photonic chips and the receiver may be made completely passive, without polarization control, phase shifter, a laser, having only waveguides and detectors. Polarisation pre-compensation in the emitter, rather than in the receiver, allows full integration of the QKD emitter on a photonic chip and requires a slow and bulky polarization rotator in neither the emitters nor the receiver. The fact that the receiver is passive, lacking polarization control, opens more possibilities in the choice of fabrication platform and makes multiplexing easier. One possible implementation for the emitters is based on an integrated optical platform such as indium phosphide, InP, or silicon on insulator, SoI. The receiver can be made on Silicon chips or free space optics, for example.

Figure 2A:
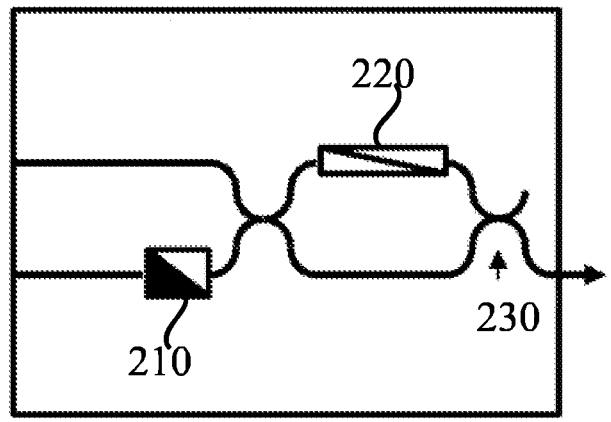
FIG. 2A illustrates a polarization rotator combiner.

FIG. 2A illustrates a polarization rotator combiner, PRC, based on InP. The PRC comprises polarization rotator 210, a birefringent waveguide 220, and a coupler 230. Polarization of the light in one of the two rails/waveguides is rotated and the two signals are combined with a Mach Zehnder interferometer, MZI.

Figure 2B:
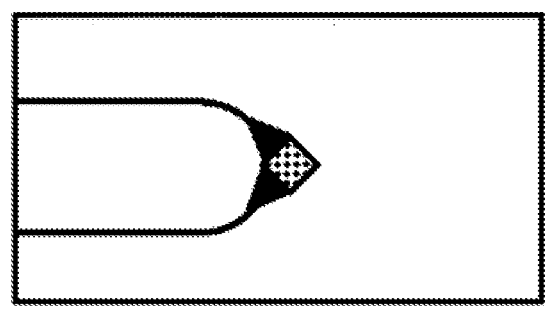
FIG. 2B illustrates a polarization rotator combiner.

FIG. 2B illustrates another PRC, this time based on SoI. On the silicon platform, output/input couplers are usually gratings deflecting the light perpendicularly to the chip. In this case the polarization rotation combination is done with a two-dimensional grating. In general, a building block in the receiver end is the polarization splitter rotator, PSR. The latter is physically the same component as the PRC but it is used in reverse.

Figure 3:
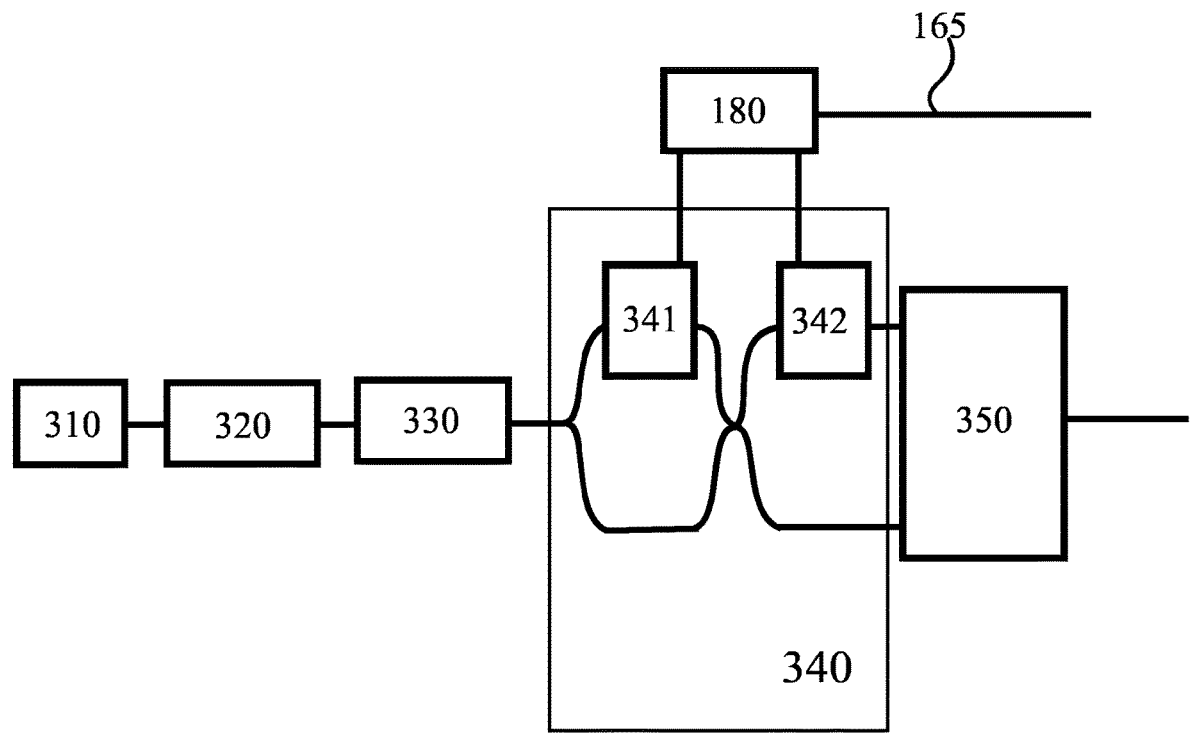
FIG. 3 illustrates an example emitter in accordance with at least some embodiments.

FIG. 3 illustrates an example emitter in accordance with at least some embodiments. A light source 310 may comprise, for example, a laser light source. To enforce a same frequency between light sources used by the emitters, the light sources of the emitters may be slave lasers of the same laser, or, alternatively, one of the light sources may be a master laser for the other light source. Either way, the light sources may be in this sense injection locked to the same frequency.

Amplitude and phase modulation take place in modulator 320, and attenuator 330 reduces the amplitude of the optical signal, for example to the single-photon range or to a range slightly above the single-photon range. Dual rail pre-compensation 340 comprises a 1×2 coupler leading the optical signal to two rails, or waveguides, from the attenuator 330, first phase shifter 341, a 2×2 coupler and a second phase shifter 342. The phase shifters are used to adjust a phase difference between the two rails. The phase shifters may be controlled by electronic controller 180, which receives information over the classical channel 165, as described herein above in connection with FIG. 1. The encoding performed by the dual-rail encoder therefore may be a combination of the information to be communicated and the compensation adjustment. PRC 350 converts the dual rail form optical signal to a single rail optical signal with the desired polarization.

Figure 4:
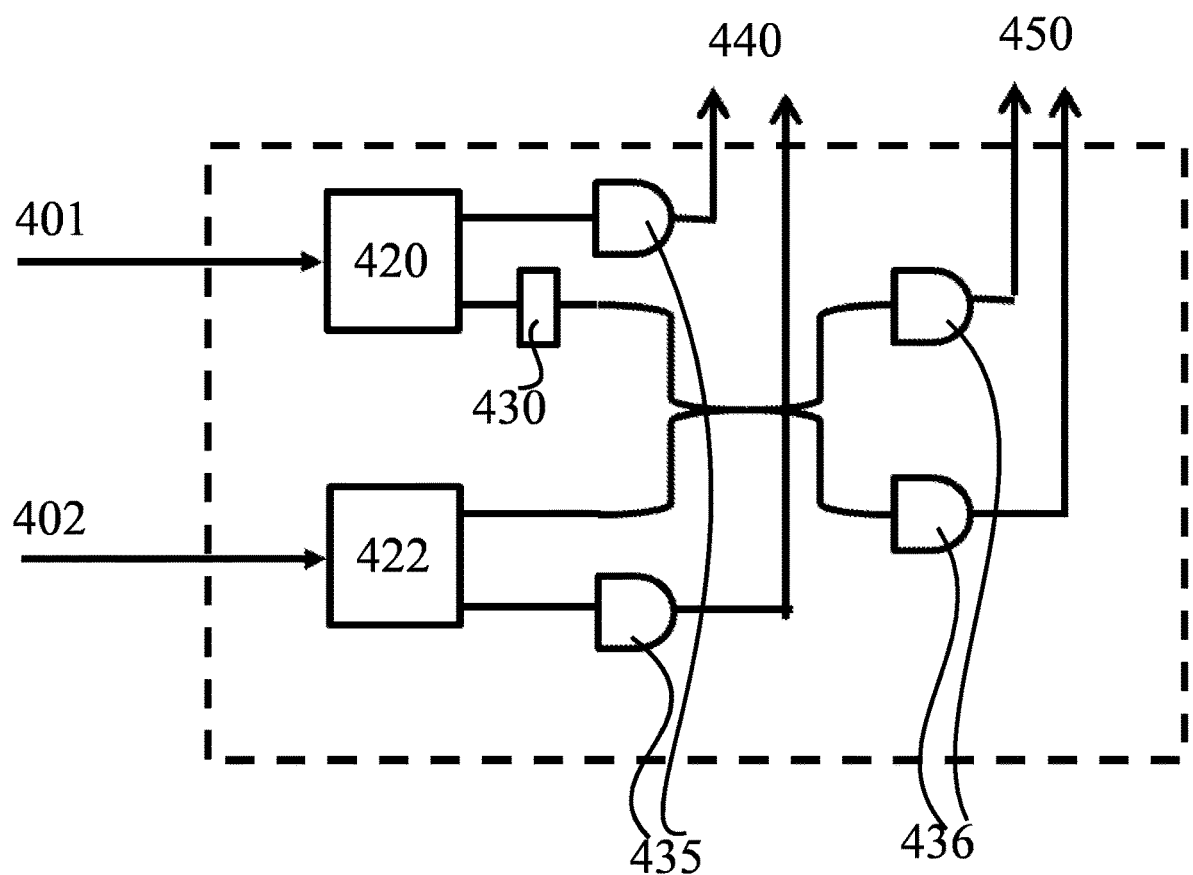
FIG. 4 illustrates an example receiver in accordance with at least some embodiments.

FIG. 4 illustrates an example receiver in accordance with at least some embodiments. The receiver may correspond to receiver 160 of FIG. 1, for example. Fibre 401 conveys an optical signal from the first emitter, and fibre 402 conveys an optical signal from the second emitter. PSRs 420 and 422 convert the received optical signals to dual rail format, an interference between the optical signals is allowed to occur before receiving the conveyed information at two-field receiver stage 450. The detectors 436 may comprise single-photon detectors, SPDs.

The receiver may also perform polarization monitoring 440, with detectors 435, which may comprise, for example, SPDs or photon detectors, PDs. A phase modulator 430 may be provided to correct a phase difference between the signals in case the emitter side does not perform phase correction.

Figure 5A:
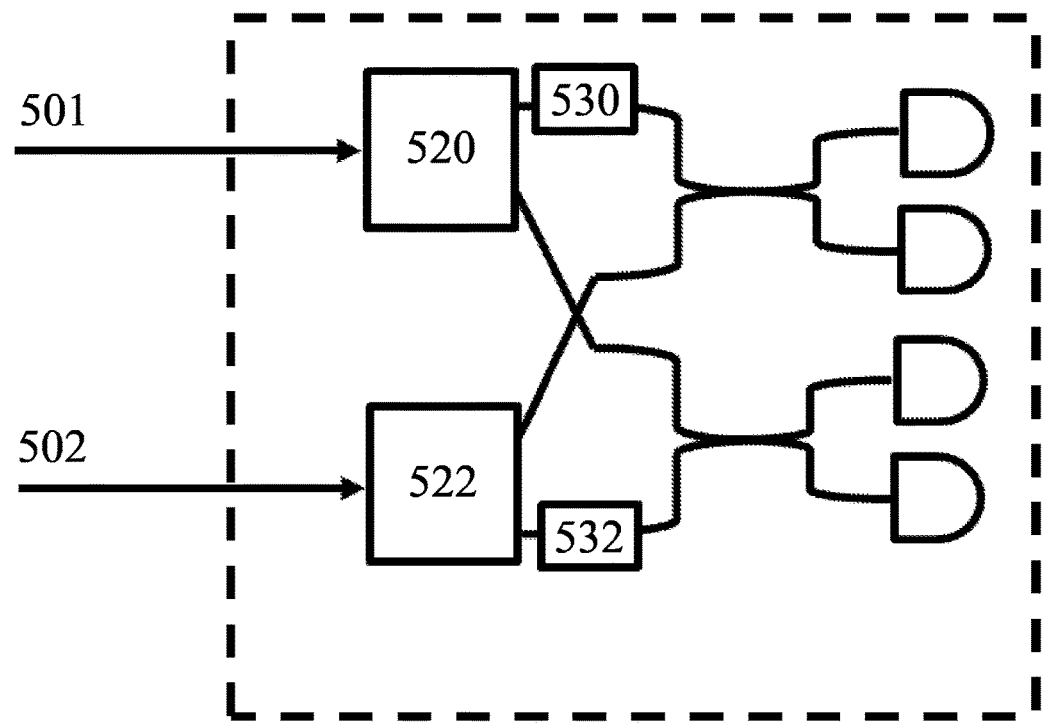
FIG. 5A illustrates an example receiver in accordance with at least some embodiments.

FIG. 5A illustrates an example receiver in accordance with at least some embodiments. Fibres 501 and 502 convey the optical signals from the first and second emitter. As in FIG. 4, also here PSRs 520, 522 convert the incoming signals to dual rail format. Phase modulators 530, 532 are provided for both incoming optical signals. Measurements can here be conducted with any polarisation as long as the two channels have the same polarisation. To do that, the one output of each PSR 520, 522 is directed to an interferometer, while the two other outputs are directed towards another interferometer for two-field QKD. Polarisation optimisation may be performed, based on public feedback of an events subset, by maximising the interference visibility in the two interferometers.

Figure 5B:
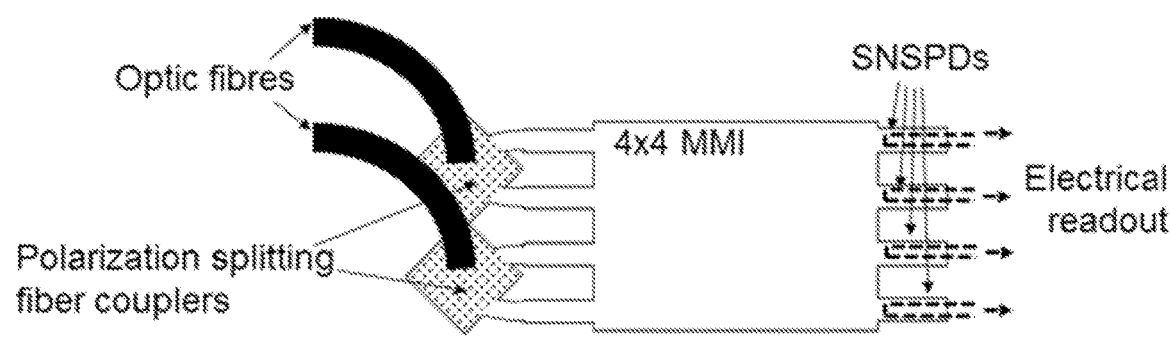
FIG. 5B illustrates an example receiver in accordance with at least some embodiments.

FIG. 5B illustrates an example receiver in accordance with at least some embodiments. The implementation of FIG. 5B is similar to that of FIG. 5A, except that it requires no waveguide crossing, as was the case for FIG. 5A. The 4×4 multimode interferometer, MMI, is twice as long as a 90-degree hybrid 4×4 MMI. In this figure the preferred implementation is silicon photonics with vertical fibre couplers and superconducting nanowire detectors, SNSPDs, deposited on the silicon waveguides for readout.

Figure 6A:
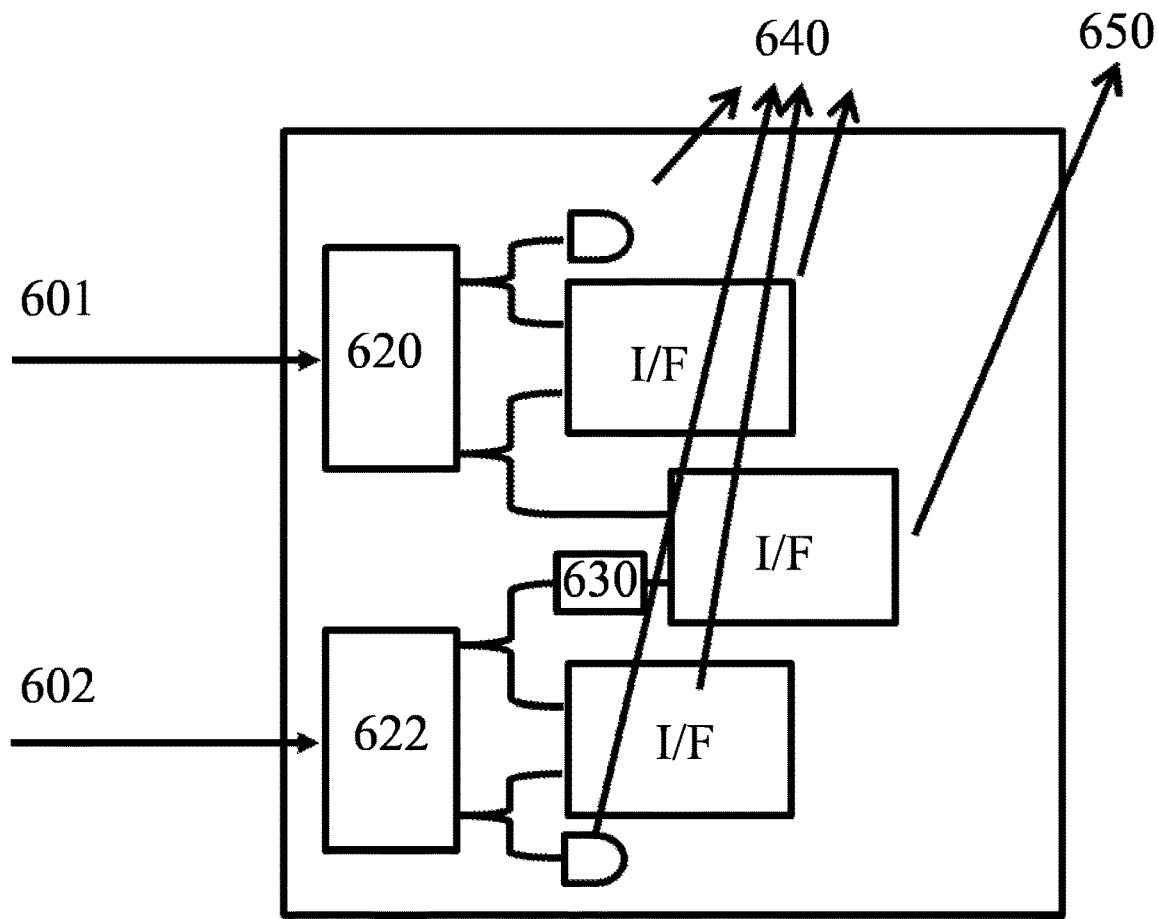
FIG. 6A illustrates an example fixed polarization receiver in accordance with at least some embodiments.
Figure 6B:
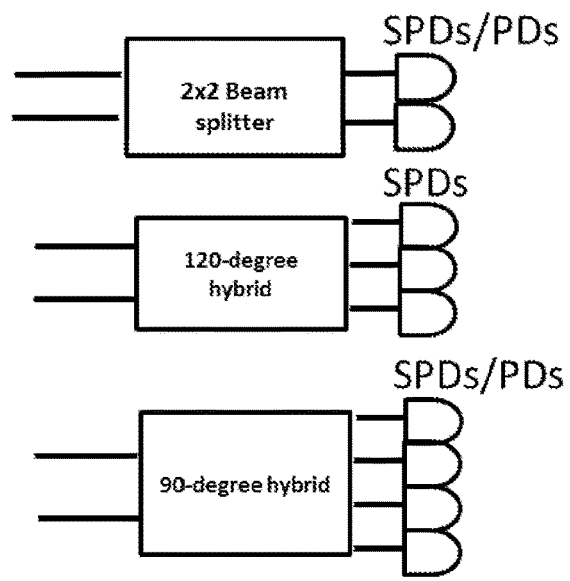
FIG. 6B illustrates examples of interferometers usable in the architecture of FIG. 6A.

FIG. 6A illustrates an example fixed polarization receiver in accordance with at least some embodiments. In this implementation, polarization monitoring interferometers enable a full characterisation of the input polarisations. This information may be provided to the emitters to allow them to correct their polarisations in one step, rather than using trial and error optimisation. The interferometer may be a simple beam splitter as in previous figures, but it may also be a more complex interferometer allowing unambiguous measurement of the phase differences. Fibres 601 and 602 convey the optical signals from the first and second emitter. As in FIGS. 4 and 5, also here PSRs 620, 622 convert the incoming signals to dual rail format. A more accurate measurement of the polarization and therefore a faster and more accurate adjustment of the polarization can be done by measuring the phase between the two outputs of the PSRs. Polarization monitoring 640 and two-field QKD 650 are performed, as in implementations described above. This can be done by redirecting part of the light towards an interferometer I/F, for example a 90-degree hybrid followed by single photon detectors or photodiodes, in case the transmitters occasionally emit intense pulses. FIG. 6B illustrates three examples of interferometers I/F usable in the architecture of FIG. 6A.

Figure 7A:
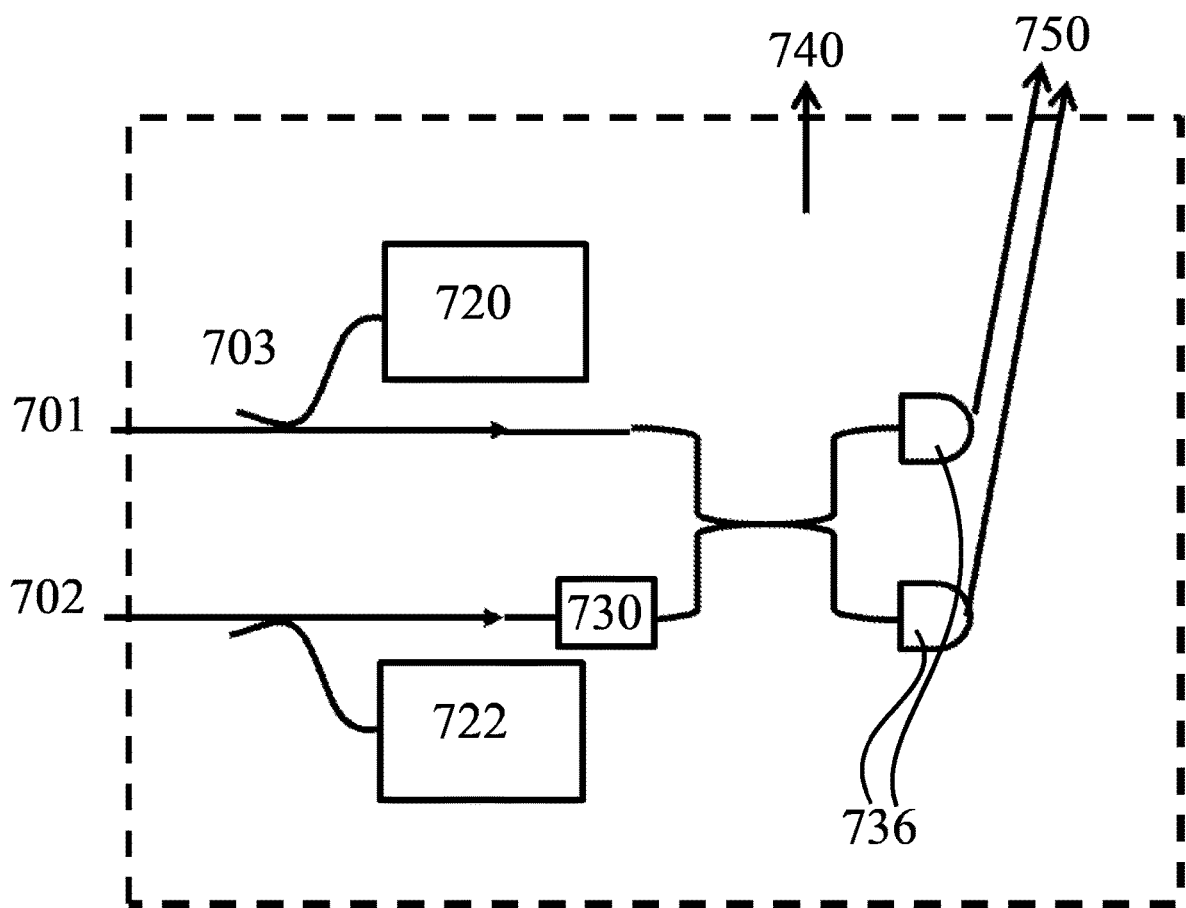
FIG. 7A illustrates an example receiver in accordance with at least some embodiments.

FIG. 7A illustrates an example fixed polarization receiver in accordance with at least some embodiments. As before, optical signals are received from the two emitters via fibres 701 and 702. In the FIG. 7 implementation, a polarization-independent tap 703 is used to split the incoming optical signal, rather than a polarization beam splitter. Part of the light is directed to the QKD interferometer, and the rest to polarization analysers 720, 722. Polarization analysis is performed in polarisation analysers 720, 722 to accomplish polarization monitoring 740. A phase modulator 730 may be provided in case the phase is not adjusted in the emitter side, and SPDs 736 are employed to perform the two-field QKD.

Figure 7B:
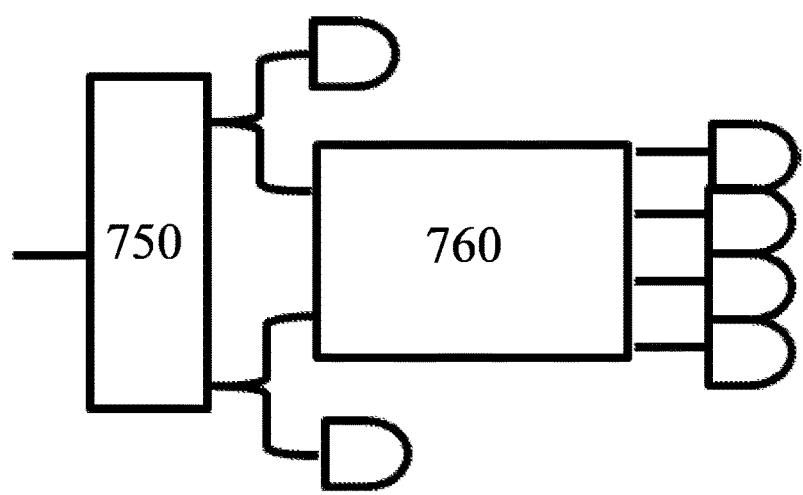
FIG. 7B illustrates an example of a polarization analyser, usable with the implementation of FIG. 7A.

FIG. 7B illustrates an example of a polarization analyser, usable with the implementation of FIG. 7A. Here a PSR 750 is used to split the light, and a 90 degree hybrid is placed before detectors, which may comprise, for example, SPDs or photodiodes.

Figure 8:
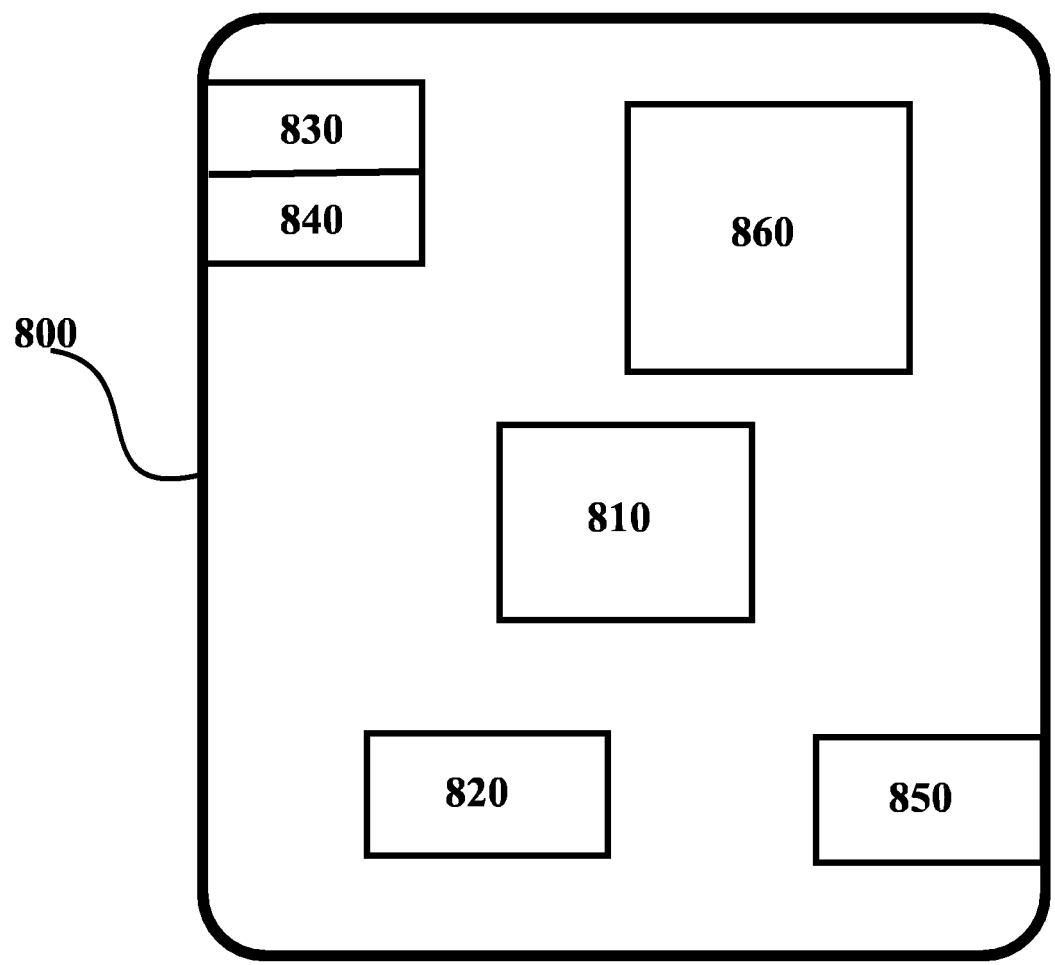
FIG. 8 illustrated a device in accordance with at least some embodiments.

FIG. 8 illustrated a device in accordance with at least some embodiments. Illustrated is device 800, which may comprise, for example, an emitter device such as the emitter of FIG. 1A or FIG. 2A. Comprised in device 800 is processor 810, which may comprise, for example, a single- or multi-core processor wherein a single-core processor comprises one processing core and a multi-core processor comprises more than one processing core. Processor 810 may comprise a Qualcomm Snapdragon 800 processor, for example. Processor 810 may comprise more than one processor. A processing core may comprise, for example, a Cortex-A8 processing core manufactured by Intel Corporation or a Brisbane processing core produced by Advanced Micro Devices Corporation. Processor 810 may comprise at least one application-specific integrated circuit, ASIC. Processor 810 may comprise at least one field-programmable gate array, FPGA. Processor 810 may be means for performing method steps in device 800. Processor 810 may be means for performing method steps in device 800. Processor 810 may be configured, at least in part by computer instructions, to perform actions.

Device 800 may comprise memory 820. Memory 820 may comprise random-access memory and/or permanent memory. Memory 820 may comprise at least one RAM chip.

Memory 820 may comprise magnetic, optical and/or holographic memory, for example. Memory 820 may be at least in part accessible to processor 810. Memory 820 may be means for storing information. Memory 820 may comprise computer instructions that processor 810 is configured to execute. When computer instructions configured to cause processor 810 to perform certain actions are stored in memory 820, and device 800 overall is configured to run under the direction of processor 810 using computer instructions from memory 820, processor 810 and/or its at least one processing core may be considered to be configured to perform said certain actions.

Device 800 may comprise a transmitter 830. Device 800 may comprise a receiver 840. Transmitter 830 and receiver 840 may be configured to transmit and receive, respectively, information in accordance with at least one cellular or non-cellular standard. Transmitter 830 may comprise more than one transmitter. Receiver 840 may comprise more than one receiver. Transmitter 830 and/or receiver 840 may be configured to operate with an optic fibre.

Device 800 may comprise a near-field communication, NFC, transceiver 850. NFC transceiver 850 may support at least one NFC technology, such as NFC, Bluetooth, Wibree or similar technologies.

Device 800 may comprise user interface, UI, 860. UI 860 may comprise at least one of a display, a keyboard or a touchscreen.

Processor 810 may be furnished with a transmitter arranged to output information from processor 810, via electrical leads internal to device 800, to other devices comprised in device 800. Such a transmitter may comprise a serial bus transmitter arranged to, for example, output information via at least one electrical lead to memory 820 for storage therein. Alternatively to a serial bus, the transmitter may comprise a parallel bus transmitter. Likewise processor 810 may comprise a receiver arranged to receive information in processor 810, via electrical leads internal to device 800, from other devices comprised in device 800. Such a receiver may comprise a serial bus receiver arranged to, for example, receive information via at least one electrical lead from receiver 840 for processing in processor 810. Alternatively to a serial bus, the receiver may comprise a parallel bus receiver.

Processor 810, memory 820, transmitter 830, receiver 840 and/or UI 860 may be interconnected by electrical leads internal to device 800 in a multitude of different ways. For example, each of the aforementioned devices may be separately connected to a master bus internal to device 800, to allow for the devices to exchange information. However, as the skilled person will appreciate, this is only one example and depending on the embodiment various ways of interconnecting at least two of the aforementioned devices may be selected without departing from the scope of the present invention.

Figure 9:
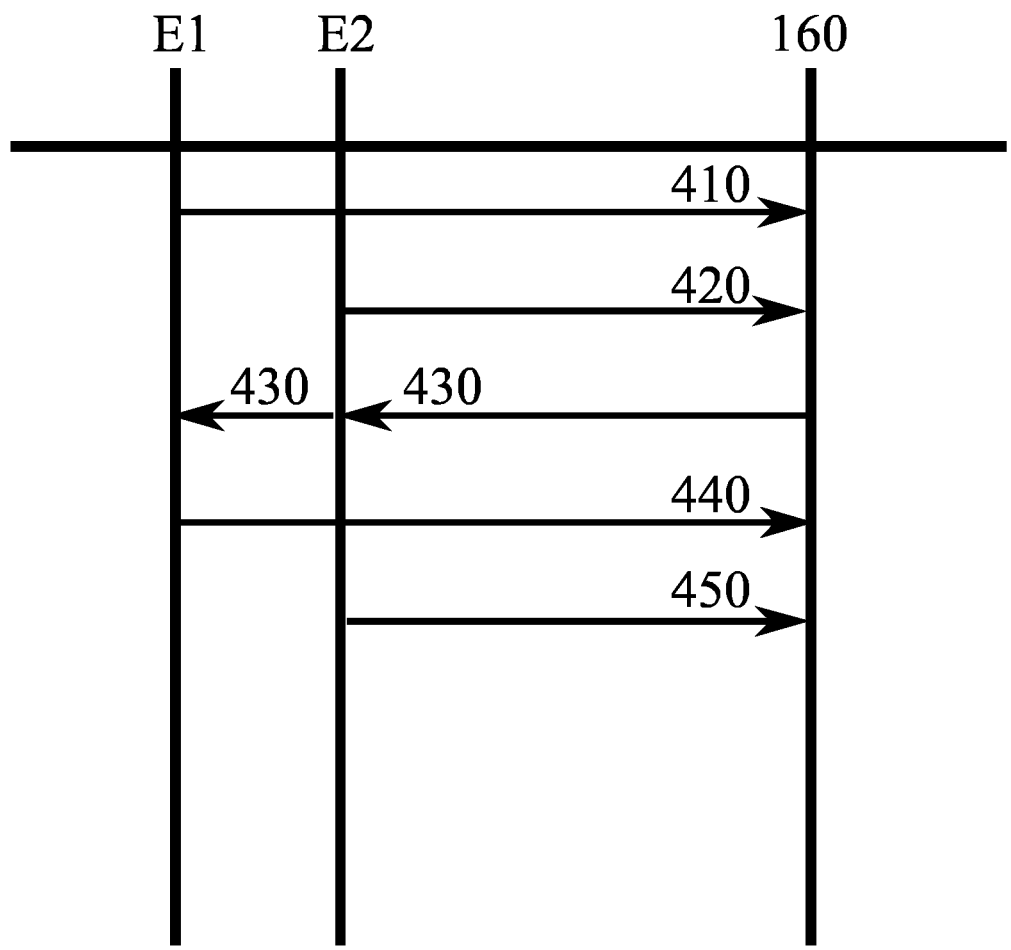
FIG. 9 is a signalling diagram in accordance with at least some embodiments.

FIG. 9 is a signalling diagram in accordance with at least some embodiments. On the vertical axes are, from the left, first emitter E1, second emitter E2, and on the right, receiver 160. In phases 410 and 420 the first and second emitters, respectively, transmit information over their fibres to receiver 160. This information need not be in the single-photon range, as described herein above. Receiver 160 measures the information it receives and provides, via the classical channel, compensation adjustment information to first and second emitters E1 and E2, in phase 430.

In phases 440 and 450, emitters E1 and E2 transmit in two-field mode to receiver 160, such that the optical signals the emitters provide via their respective fibres are pre-corrected to account for the effect of the fibres on polarization and, optionally, phase. Thus receiver 160 can receive the optical signals via the fibres with the same polarization, enabling successful interference between the optical signals.

Figure 10:
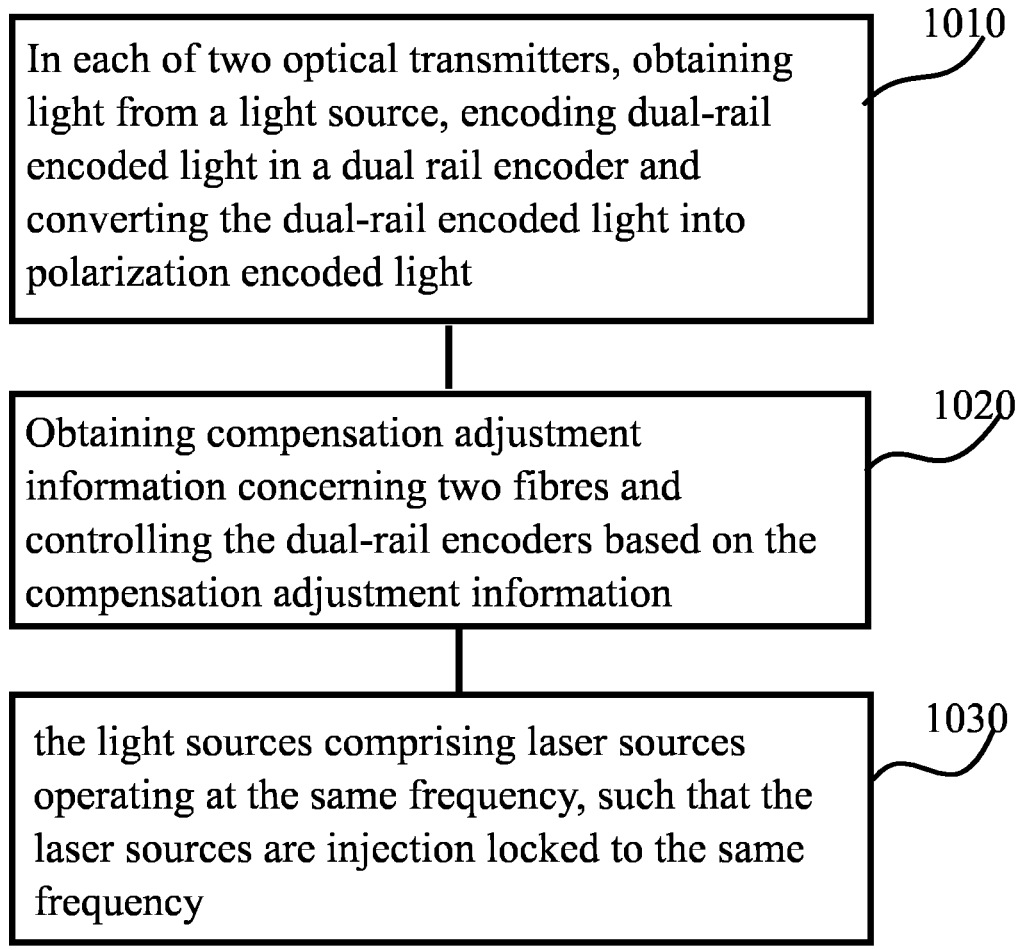
FIG. 10 is a second flow graph of a second method in accordance with at least some embodiments of the present invention.

FIG. 10 is a first flow graph of a first method in accordance with at least some embodiments of the present invention. The phases of the illustrated first method may be performed in an emitter, for example. Phase 1010 comprises, in each of two optical transmitters, obtaining light from a light source, encoding dual-rail encoded light in a dual-rail encoder and converting the dual-rail encoded light into polarization encoded light. Phase 1020 comprises obtaining compensation adjustment information concerning two fibres and controlling the dual-rail encoders based at least in part on the compensation adjustment information, wherein the light sources comprise laser sources operating at the same frequency, such that the laser sources are injection locked to the same frequency, phase 1030.

Figure 11:
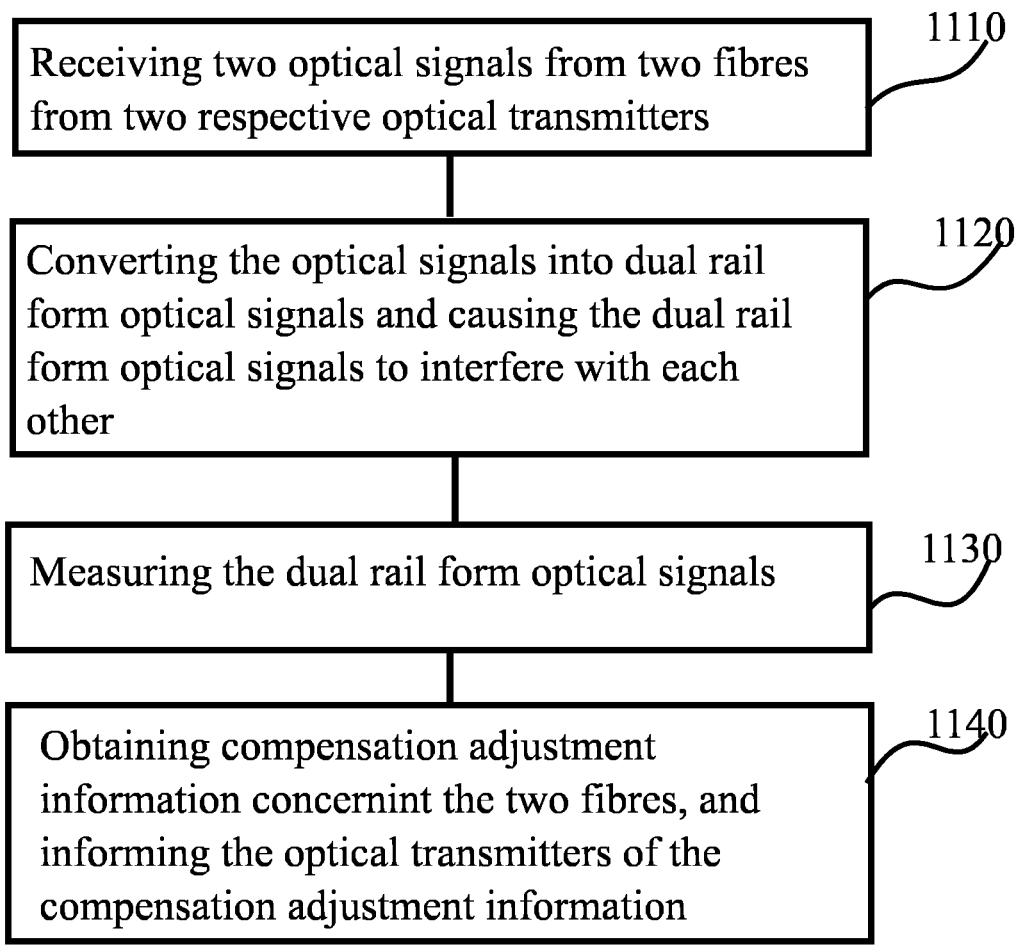
FIG. 11 is a second flow graph of a second method in accordance with at least some embodiments of the present invention.

FIG. 11 is a second flow graph of a second method in accordance with at least some embodiments of the present invention. The phases of the illustrated first method may be performed in a receiver, for example. Optional phase 1110 comprises converting incoming polarization encoded light to dual-rail encoded light. Phase 1120 comprises measuring encoded light in at least two different bases. In embodiments comprising optional phase 1110, the measured encoded light is dual-rail encoded light. Phase 1130 comprises obtaining compensation adjustment information concerning a fibre. Finally, phase 1140 comprises adjusting at least one of the encoded light and an output of at least one detector based at least in part on the compensation adjustment information. Obtaining compensation adjustment information concerning the fibre may comprise deriving the compensation adjustment information concerning the fibre.

An advantage of pre-compensating for rotations incurred in the fibres in a dual-rail encoded phase, rather than in a polarization encoded phase, is that a compact, integrated implementation on a chip for at least one of the emitter and the receiver is possible. Truly efficient compensation in polarization encoded phase typically requires controlling polarization of light in the receiver, using fibre straining or free space, which is bulky.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. An apparatus comprising:
    two optical transmitters, each optical transmitter comprising a dual-rail encoder configured to obtain light from a light source and to output dual-rail encoded light and a polarization rotator combiner configured to convert the dual-rail encoded light into polarization encoded light;
    at least one processing core configured to obtain compensation adjustment information concerning two fibres and to control the dual-rail encoders based at least in part on the compensation adjustment information, wherein
    the light sources of the optical transmitters comprise laser sources operating at the same frequency, such that the laser sources are injection locked to the same frequency.

2. The apparatus according to claim 1, wherein the at least one processing core is configured to, based on the compensation adjustment information, control the dual-rail encoders such that at a receiver connected to the two fibres, optical signals from the two optical transmitters arrive with the same polarization.

3. The apparatus according to claim 2, wherein the at least one processing core is configured to, based on the compensation adjustment information, control the dual-rail encoders such that the same polarization is an optimal polarization for the receiver.

4. The apparatus according to claim 1, wherein the apparatus is configured to obtain the compensation adjustment information via a communication channel with the receiver, the communication channel not traversing either of the two fibres.

5. The apparatus according to claim 1, wherein the light sources are slave lasers of a single master laser or one of the light sources is a slave laser of the other light source.

6. The apparatus according to claim 1, wherein the at least one processing core is configured to control the dual rail encoders to pre-compensate for phase rotation in the two fibres.

7. The apparatus according to claim 1, wherein the at least one processing core is configured to control the dual rail encoders by causing, in each dual rail encoder, an adjustment of a phase difference and a relative amplitude of the two rails.

8. The apparatus according to claim 1, wherein the apparatus is comprised on a single photonic chip.

9. An apparatus comprising:
    two inputs configured to receive two optical signals from two fibres from two respective optical transmitters;
    a beam splitter configured to convert the optical signals into dual rail form, the apparatus being configured to cause the optical signals to interfere with each other;
    a plurality of single photon detectors configured to measure the dual rail form optical signals, and
    at least one processing core configured to obtain compensation adjustment information concerning the two fibres and to inform the optical transmitters of the compensation adjustment information.

10. The apparatus according to claim 9, wherein the beam splitter comprises a polarization splitter rotator and the apparatus further comprises a second polarization splitter rotator, each polarization splitter rotator being configured to process one of the two optical signal inputs.

11. The apparatus according to claim 9, further comprising a phase modulator configured to adjust the phase of one of rails of one of the dual rail optical signals.

12. The apparatus according to claim 9, further comprising two interferometers, each interferometer coupled to exactly one rail of each of the two dual rail optical signals.

13. The apparatus according to claim 9, further comprising at least one polarization analyser.

14. A method, comprising:
    in each of two optical transmitters, obtaining light from a light source, encoding dual-rail encoded light in a dual-rail encoder and converting the dual-rail encoded light into polarization encoded light;
    obtaining compensation adjustment information concerning two fibres and controlling the dual-rail encoders based at least in part on the compensation adjustment information, wherein
    the light sources comprise laser sources operating at the same frequency, such that the laser sources are injection locked to the same frequency.

15. The method according to claim 14, comprising controlling, based on the compensation adjustment information, the dual-rail encoders such that at a receiver connected to the two fibres, optical signals from the two optical transmitters arrive with the same polarization.

16. The method according to claim 15, comprising controlling, based on the compensation adjustment information, the dual-rail encoders such that the same polarization is an optimal polarization for the receiver.

17. The method according to claim 14, comprising obtaining the compensation adjustment information via a communication channel with the receiver, the communication channel not traversing either of the two fibres.

18. The method according to claim 14, wherein the light sources are slave lasers of a single master laser or one of the light sources is a slave laser of the other light source.

19. The method according to claim 14, further comprising controlling the dual rail encoders to pre-compensate for phase rotation in the two fibres.

20. The method according to claim 14, comprising controlling the dual rail encoders by causing, in each dual rail encoder, an adjustment of a phase difference and a relative amplitude of the two rails.

* * * * *